UNITED STATES PATENT OFFICE.

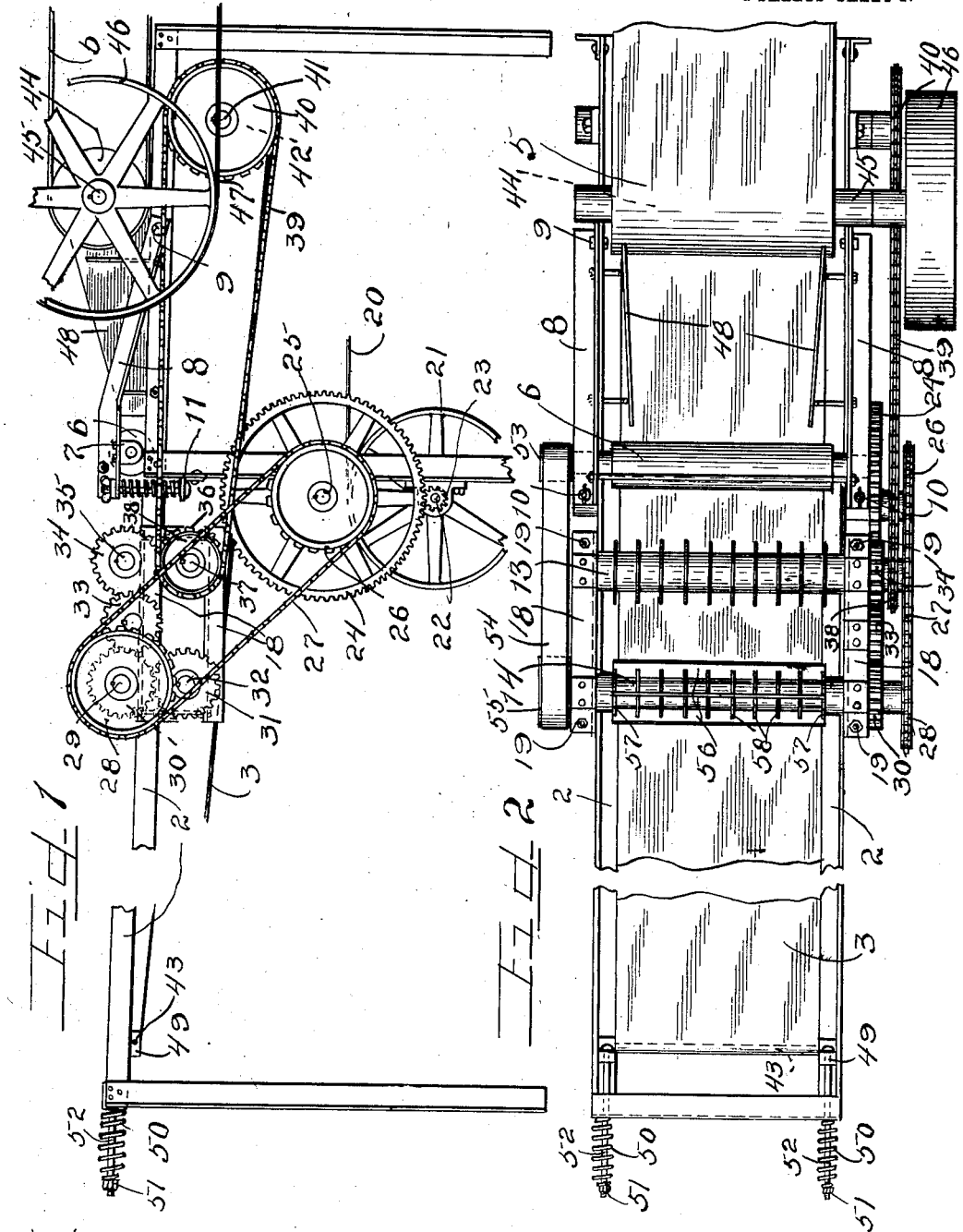

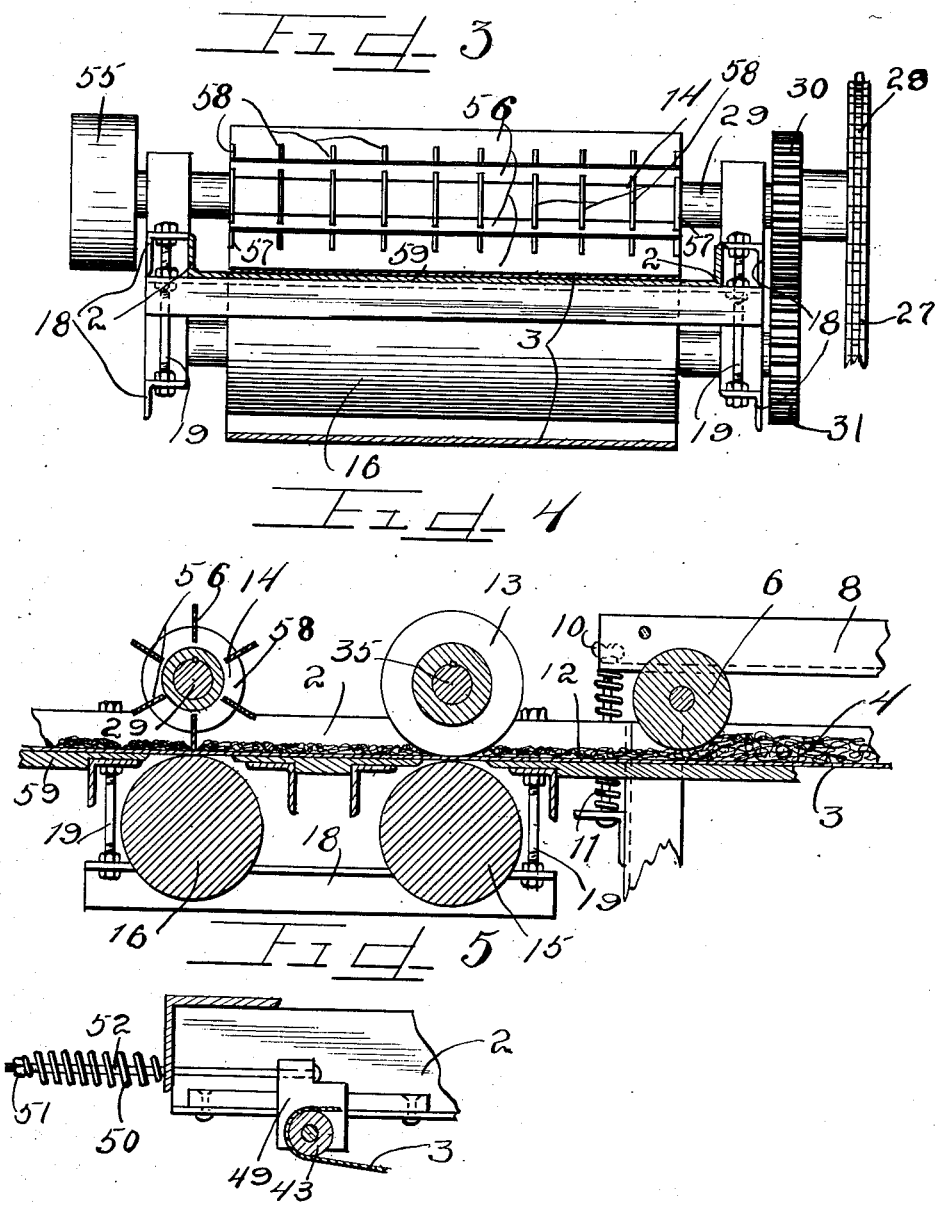

WILLIAM ERASTUS WILLIAMS, OF CHICAGO, ILLINOIS.

MACHINE FOR MAKING SHREDDED-WHEAT BISCUITS OR SIMILAR ARTICLES.

1,062,627.  Specification of Letters Patent.  Patented May 27, 1913.

Application filed April 13, 1908. Serial No. 426,818.

*To all whom it may concern:*

Be it known that I, WILLIAM ERASTUS WILLIAMS, a citizen of the United States, residing at Chicago, in the county of Cook and State of Illinois, have invented a new and useful Improvement in Machines for Making Shredded-Wheat Biscuits or Similar Articles, of which the following is a specification.

The object of my invention is to convert shreds or filaments of wheat or other food stuffs into biscuits or cakes in a rapid, simple, cheap, and desirable way, whereby any desired degree of packing down or matting of the shreds may be secured.

Reference will be had to the accompanying drawings in which:

Figure 1 is a side elevation of the machine. Fig. 2 is a plan view. Fig. 3 is an end section on line 3—3 of Fig. 2. Fig. 4 is a longitudinal vertical sectional view showing the material in process of operation. Fig. 5 is a detail of the belt tightener.

In the drawing 2 designates the frame of the machine which is here shown as made of angle pieces of metal.

3 indicates a traveling carrier belt made of any suitable material or it may be any suitable carrier. This carrier 3 receives the shredded or filamented or other material as it comes from any suitable source of supply in a continuous uniform deposit 4. This source of supply is here shown as an additional carrier belt 5 coming from the shredding machines. The deposit 4 of the shreds passes underneath a roller 6 which pushes the deposit down to any desired thickness or hardness. The roller 6 is carried in bearings 7 carried upon a frame 8 pivoted at 9 to the frame of the machine, and is adjusted downward by thumb-screws 10, and is held upward by springs 11. After passing roller 6 the deposit is crushed or matted down into a mat 12 the desired thickness for the biscuit or cracker and the mat then passes underneath a slitting roller 13 which cuts the mat into strips longitudinally. And these strips then pass underneath a cross cutting roller 14 which cuts them transversely and the biscuits or crackers are then taken up by a "peeler" and they pass off automatically on to suitable pans arranged to receive them. Underneath each cutting roller 13 and 14 there is arranged an abutting roller 15 and 16 to receive the thrust of the cutting and the carrier 3 passes between the rollers along with the material to be cut. The cutting rollers 13 and 14 are mounted in bearings mounted upon bars 18 adjustable to the frame by studs 19 and the rolls 15 and 16 are similarly mounted.

The machine is driven from any suitable source of power by a belt 20 on a wheel 21 on a shaft 22 mounted on posts of frame 2 and carrying a pinion 23 engaging a gear wheel 24 mounted on a shaft 25 which also carries a sprocket 26 driving a chain 27 driving a sprocket 28 on shaft 29 of transverse cutting roll 14. A gear 30 on shaft 29 engages a gear 31 on shaft 32 which is the shaft of roll 16 whereby abutting roll 16 is made to travel in time with its cutter roll 14. An idle gear 33 engages gear 30 and is driven thereby and it engages 34 on shaft 35 which is the shaft of slitting roll 13 whereby, slitting roll 13 is positively driven. Gear 34 engages and drives gear 36 on shaft 37 whereby roll 15 is driven. A sprocket 38 on shaft 37 drives a chain 39 which drives a sprocket 40 on shaft 41 of roller 42 over which carrier belt 3 travels and whereby it is driven. The source of supply belt 5 passes over a roller 44 on a shaft 45 driven by a belt wheel 46 driven by a belt 47 from any suitable source of power. Fenders 48 are mounted at the sides of belt or carrier 3 to direct the discharge from belt 5 upon belt 3 within definite side limits which saves waste of the material acted upon. Carrier 3 passes over a small roller 43 at its outer end which roller is mounted in bearings 49 mounted to slide longitudinally in the frame and held by springs 50 to exert an elastic stretch or take up to carrier belt 3. Springs 50 are adjusted by nuts 51 on rods 52 secured to the bearings 49. Compression roller 6 is driven by a belt wheel 53 driven by a belt 54 driven by a wheel 55 on shaft 29 of roller 14. All of the revolving parts are what are termed live rolls which insure a positive action and does not distort the material acted upon which is a desideratum.

Underneath carrier belt 3 there are provided plates or tables 59, which support the carrier underneath the compression roller and also at other points save only where the cutting rollers require apertures for their admission to contact with the carrier belt.

The cutting roller 14 is made of longitudinal slats 56 secured at their ends to disks 57, and supported at frequent intervals by intermediate disks 58 which construction allows cutter blades to be used and yet produce a rigid cutter roller and one cheaply constructed.

The web or mat of material is very fragile and is also more or less sticky and cannot be cut properly by the ordinary mechanisms used in the bakers' art. The separate cutting roller arranged to act on the mat at different points insures against the mat curling up and following the cutter or from being distorted as is the case when ordinary cutting means are used.

What I claim is:

1. In apparatus of the class described, the combination with a table provided with narrow transverse slots, of an endless belt arranged to have one of its folds travel along the surface of the table over said slots, vertically adjustable rollers arranged to rotate in said slots, respectively, below the belt, cutting rollers mounted above the belt in registry with the rollers below the belt, respectively, to divide into separate masses the material passing on the belt, and means for delivering a continuous mass of shreds upon the belt.

2. In a machine of the class described the combination of a longitudinal frame supporting sections of a table or flat plates, a carrier belt moving over these tables or plate apertures in these tables or plates, cutting rollers mounted at these apertures to act on the material on the carrier, with a compression roll mounted to act upon the material of the carrier at a point where the carrier is supported by a plate or table.

In witness whereof I have hereunto subscribed my name at the city of Chicago, on this 16th day of March, 1908 in the presence of two subscribing witnesses.

WILLIAM ERASTUS WILLIAMS.

Witnesses:
R. ROPER,
JOHN GRANT.